(12) United States Patent
Wamprecht et al.

(10) Patent No.: US 8,476,362 B2
(45) Date of Patent: Jul. 2, 2013

(54) MOISTURE-CURING POLYISOCYANATE MIXTURES

(75) Inventors: Christian Wamprecht, Neuss (DE); Iker Zuazo Osaca, Shanghai (CN)

(73) Assignee: Bayer MaterialScience AG, Leverkusen (DE)

( * ) Notice: Subject to any disclaimer, the term of this patent is extended or adjusted under 35 U.S.C. 154(b) by 633 days.

(21) Appl. No.: 12/582,356

(22) Filed: Oct. 20, 2009

(65) Prior Publication Data

US 2010/0099816 A1    Apr. 22, 2010

(30) Foreign Application Priority Data

Oct. 22, 2008 (DE) .......................... 10 2008 052 765

(51) Int. Cl.
*B32B 27/00* (2006.01)
*B32B 27/40* (2006.01)
*C08G 18/00* (2006.01)
*C08G 18/08* (2006.01)
*C08G 18/10* (2006.01)
*C08G 18/28* (2006.01)
*C08G 18/32* (2006.01)
*C08G 18/70* (2006.01)
*C08J 3/00* (2006.01)
*C08K 3/20* (2006.01)
*C08L 75/00* (2006.01)

(52) U.S. Cl.
USPC .......... 524/590; 428/423.1; 524/589; 528/44; 528/59; 528/61; 528/67; 528/71; 528/76; 528/77; 528/85

(58) Field of Classification Search
USPC ................ 524/589, 590; 428/423.1; 528/44, 528/59, 61, 67, 71, 76, 77, 85
See application file for complete search history.

(56) References Cited

U.S. PATENT DOCUMENTS

| | | | |
|---|---|---|---|
| 3,358,010 A | 12/1967 | Britain | |
| 3,903,127 A | 9/1975 | Wagner et al. | |
| 4,264,519 A | 4/1981 | Hennig et al. | |
| 4,288,586 A | 9/1981 | Bock et al. | |
| 4,292,255 A | 9/1981 | Hennig et al. | |
| 4,324,879 A | 4/1982 | Bock et al. | |
| 4,379,905 A | 4/1983 | Stemmler et al. | |
| 4,419,513 A | 12/1983 | Breidenbach et al. | |
| 4,487,928 A | 12/1984 | Richter et al. | |
| 4,518,761 A | 5/1985 | Richter et al. | |
| 4,663,377 A * | 5/1987 | Hombach et al. | 524/196 |
| 4,994,541 A | 2/1991 | Dell et al. | |
| 5,064,960 A | 11/1991 | Pedain et al. | |
| 5,723,564 A | 3/1998 | Schmalstieg et al. | |
| 5,914,383 A | 6/1999 | Richter et al. | |
| 6,090,939 A | 7/2000 | Richter et al. | |
| 6,107,484 A | 8/2000 | Richter et al. | |
| 7,553,902 B2 * | 6/2009 | Haeberle et al. | 524/590 |
| 7,906,606 B2 * | 3/2011 | Niesten et al. | 528/59 |
| 2005/0222292 A1 | 10/2005 | Niesten et al. | |

FOREIGN PATENT DOCUMENTS

| | | |
|---|---|---|
| CA | 2244486 A1 | 2/1999 |
| DE | 110139 | 7/1898 |
| DE | 1090196 | 10/1960 |
| DE | 3033860 A1 | 4/1982 |
| DE | 3100262 A1 | 8/1982 |
| DE | 3100263 A1 | 8/1982 |
| DE | 3144672 A1 | 5/1983 |
| DE | 3928503 A1 | 3/1991 |
| DE | 19523657 A1 | 1/1997 |
| EP | 0003505 A1 | 8/1979 |
| EP | 0295568 A2 | 12/1988 |
| EP | 0377177 A1 | 7/1990 |
| EP | 0761708 A2 | 3/1997 |
| EP | 0798299 A1 | 10/1997 |
| EP | 0896009 A1 | 2/1999 |
| EP | 0962454 A1 | 12/1999 |
| EP | 0962455 A1 | 12/1999 |
| EP | 1582543 A1 | 10/2005 |
| WO | WO-97/40086 A1 | 10/1997 |

OTHER PUBLICATIONS

DIN 53211.

* cited by examiner

*Primary Examiner* — Patrick Niland
(74) *Attorney, Agent, or Firm* — Novak Druce Connolly Bove + Quigg LLP

(57) ABSTRACT

The invention relates to moisture-curing polyisocyanate mixtures, to a process for their preparation and to their use as binders in lacquers, coatings, adhesives and sealing materials.

9 Claims, No Drawings

MOISTURE-CURING POLYISOCYANATE MIXTURES

RELATED APPLICATIONS

This application claims benefit to German Patent Application No. 10 2008 052 765.3, filed Oct. 22, 2008, which is incorporated herein by reference in its entirety for all useful purposes.

BACKGROUND OF THE INVENTION

The invention relates to moisture-curing polyisocyanate mixtures, to a process for their preparation and to their use as binders in lacquers, coatings, adhesives and sealing materials.

Moisture-curing prepolymers as a constituent of one-component lacquers have been known for a long time (e.g. H. Kittel, Lehrbuch der Lacke and Beschichtungen, 2, S. Hirzel Verlag, Stuttgart, Leipzig, 1998). Such systems consist of polyurethane prepolymers having free, terminal isocyanate groups (NCO groups). After application, crosslinking takes place under the influence of atmospheric moisture to form urea groups.

For quick drying, prepolymers based on aromatic isocyanates, in particular 2,4- and optionally 2,6-diisocyanatotoluene (TDI), are particularly suitable. In particular the isocyanurate-group-containing polyisocyanates based on the mentioned TDI types are valuable components for the preparation of quick-drying polyurethane coatings for the wood and furniture sector. Quick drying is caused by the high degree of crosslinking of these products. This leads to a rapid rise in the glass transition temperature during the crosslinking reaction to form urea groups.

However, because of the high degree of crosslinking, such quick-drying systems are often brittle and films produced from such lacquers do not have the required elasticity. Cracks can thus form in the lacquer, especially in the case of pronounced changes in temperature. This is true in particular of coatings on substrates that are subject to considerable variations in volume, for example wood.

In order to render such TDI trimers flexible, high molecular weight polyethers, for example, are suitable for synthesising the prepolymer. As a result of being rendered flexible, the polymers generally become so soft that the drying speed falls markedly. In practice, this means that such moisture-curing coatings based on polyurethane prepolymers dry markedly more slowly than, for example, the widely used nitrocellulose combi lacquers (NC lacquers). The compatibility of long-chained polyethers with TDI isocyanurates is limited, which occasionally leads, even with small amounts of polyether, to products which are cloudy or not stable to storage. The teaching of EP-A 1 582 543 represents a solution to the problems outlined above. In that specification it was found that elastic and at the same time quick-drying moisture-curing lacquers can be formulated if there is used as the isocyanate component a solvent-containing preparation comprising NCO-group-containing prepolymers based on TDI trimers and diphenylmethane diisocyanate, at least one of the prepolymers having been prepared using a polyether diol containing ethylene oxide blocks and having a number-average molecular weight of from 3000 to 4500 g/mol and an ethylene oxide content of from 2 to 18 wt. %, based on all the alkylene oxide units present in the diol.

A disadvantage of the coating systems based on EP-A 1 582 543 is the relatively low solids content of from 30 to 35 wt. % of the lacquers formulated therefrom, and in particular their poor resistance to light and weathering, which manifests itself in a negative manner as a strong tendency to yellowing.

Accordingly, it was an object of the present invention to provide polyisocyanate mixtures with which it is possible to produce lacquers and coatings which have comparable drying speeds compared with NC lacquers, exhibit the required degree of elasticity and high resistance to solvents and chemicals and do not have the disadvantages of the prior art outlined above.

In particular, lacquers based on the novel products are to have a solids content of >50 wt. % and are to dry equally as quickly. The tendency of the coatings to yellowing is to be improved markedly as compared with the prior art.

It has now been found that polyisocyanate mixtures based on prepolymers, based on TDI isocyanurates and specific nitrogen-containing polyethers, and aliphatic polyisocyanates can be formulated to moisture-curing lacquers which have a relatively high solids content of >50 wt. % and which can be processed to quick-drying, elastic coatings which at the same time have high hardness, very good resistance to solvents and chemicals and also good resistance to yellowing under the action of light.

EMBODIMENTS OF THE INVENTION

An embodiment of the present invention is a solvent-containing polyisocyanate mixture having a solvent content of less than 50 weight % at a runout viscosity at 23° C. of 20 s, an NCO content of from 7 to 15 weight %, a content of monomeric TDI of less than 0.2 weight %, and a content of monomeric aliphatic and/or cycloaliphatic isocyanates of less than 0.2 weight %, wherein said mixture consists of:
  A) a TDI component containing TDI isocyanurate polyisocyanates;
  B) an aliphatic and/or cycloaliphatic isocyanate component containing aliphatic and/or cycloaliphatic polyisocyanates;
  and the reaction product of at least one of components A) and/or B) with
  C) at least one polyether polyol having a number-average molecular weight of from 500 to 4000 g/mol that contains at least one tertiary nitrogen atom;
  and
  D) optionally at least one polyether polyol that does not contain nitrogen atoms.

Yet another embodiment of the present invention is a process for preparing the above solvent-containing polyisocyanate mixture, wherein a prepolymer mixture of
  A) a TDI component containing TDI isocyanurate polyisocyanates; and
  B) an aliphatic and/or cycloaliphatic isocyanate component containing aliphatic and/or cycloaliphatic polyisocyanates;
  is prepared by reacting at least one of the two components A) and/or B) with
  C) at least one polyether polyol having a number-average molecular weight of from 500 to 4000 g/mol that contains at least one tertiary nitrogen atom; and
  D) optionally at least one polyether polyol that does not contain nitrogen atoms;
  in the presence of organic solvents.

Another embodiment of the present invention is the above process, wherein said process is carried out with the concomitant use of stabilisers and catalysts.

Another embodiment of the present invention is the above process, wherein A) is used in an amount of from 55 to 95 weight % and B) is used in an amount of from 5 to 45 weight %, based on the total amount of A) and B).

Yet another embodiment of the present invention is a coating comprising
a) the above solvent-containing polyisocyanate mixture;
b) a catalyst that accelerates the reaction of free NCO groups with moisture; and
c) one or more auxiliary substances and additives.

Yet another embodiment of the present invention is coating, adhesive bond, and/or seal comprising the above solvent-containing polyisocyanate mixture.

Yet another embodiment of the present invention is an adhesive comprising the above solvent-containing polyisocyanate mixture.

Yet another embodiment of the present invention is a sealing material comprising the above solvent-containing polyisocyanate mixture.

Yet another embodiment of the present invention is a substrate coated with a coating comprising the solvent-containing polyisocyanate mixture.

DESCRIPTION OF THE INVENTION

The invention therefore provides solvent-containing polyisocyanate mixtures having a solvent content of <50 wt. % at a runout viscosity of 20 s (DIN 4 mm beaker, 23° C.), an NCO content of from 7 to 15 wt. %, a content of monomeric TDI of less than 0.2 wt. %, a content of monomeric aliphatic and/or cycloaliphatic isocyanates, for example hexamethylene diisocyanate (HDI), isophorone diisocyanate (IPDI) and 4,4'-diisocyanatodicyclohexylmethane, of less than 0.2 wt. %, characterised in that they consist of:
A) a TDI component containing TDI isocyanurate polyisocyanates and
B) an aliphatic and/or cycloaliphatic isocyanate component containing aliphatic and/or cycloaliphatic polyisocyanates,
and reaction products of at least one of components A) and B) with
C) at least one polyether polyol having a number-average molecular weight of from 500 to 4000 g/mol that contains at least one tertiary nitrogen atom, and
D) optionally at least one polyether polyol that does not contain nitrogen atoms.

The invention further provides a process for the preparation of the solvent-containing polyisocyanate mixtures, in which prepolymers of
A) a TDI component containing TDI isocyanurate polyisocyanates and
B) an aliphatic and/or cycloaliphatic isocyanate component containing aliphatic and/or cycloaliphatic polyisocyanates
are prepared by reacting at least one of the two components with
C) at least one polyether polyol having a number-average molecular weight of from 500 to 4000 g/mol that contains at least one tertiary nitrogen atom, and
D) optionally at least one polyether polyol that does not contain nitrogen atoms,
in the presence of organic solvents.

In the preparation of the polyisocyanate mixtures according to the invention there are used as TDI isocyanurate polyisocyanates A) typically isocyanurates of TDI isomer mixtures of 2,4-TDI and 2,6-TDI containing preferably from 80 to 100 wt. % of the 2,4-isomer and from 0 to 20 wt. % of the 2,6-isomer and most particularly preferably 80 wt. % of the 2,4-isomer and 20 wt. % of the 2,6-isomer, those percentages being based on the solvent-free polyisocyanate resin.

Isocyanurate polyisocyanates of TDI are obtainable by catalytic trimerisation of the corresponding toluylene diisocyanates according to known methods. These are described, for example, in DE-A 195 23 657 and DE-A 392 85 03.

In the preparation of the polyisocyanate mixtures according to the invention, the TDI isocyanurate polyisocyanates in A) are preferably used in the form of an organic solution having an NCO content of from 7 to 8.5 wt. %, a content of TDI residual monomers of <0.5 wt. % and a solids content of from 30 to 70 wt. %. As organic solvents there can be used esters, for example ethyl acetate, butyl acetate, methoxypropyl acetate, methyl glycol acetate, ethyl glycol acetate, diethylene glycol monomethyl ether acetate; ketones, for example methyl ethyl ketone, methyl isobutyl ketone, methyl amyl ketone; aromatic compounds, for example toluene and xylene, as well as the higher-boiling hydrocarbon mixtures conventional in lacquer chemistry. The use of esters is preferred, with butyl acetate being particularly preferred.

In the preparation of the polyisocyanate mixtures according to the invention there are used as the aliphatic and/or cycloaliphatic polyisocyanate component B) typically the lacquer polyisocyanates known per se having urethane, uretdione, allophanate, biuret, iminooxadiazinedione and/or isocyanurate groups.

There come into consideration as preferred representatives of component B) the urethane-, uretdione-, allophanate-, biuret-, iminooxadiazinedione- and/or isocyanurate-group-containing polyisocyanates known per se in lacquer chemistry, which are obtainable by modifying monomeric aliphatic, cycloaliphatic and/or araliphatic diisocyanates in a manner known to the person skilled in the art. Examples of diisocyanates which may be mentioned include 1,6-diisocyanatohexane, 1-isocyanato-3,3,5-trimethyl-5-isocyanatomethylcyclohexane (isophorone diisocyanate), 4,4'-diisocyanatodicyclohexylmethane, 1,4-diisocyanatocyclohexane, 1-methyl-2,4-diisocyanatocyclohexane, 1-methyl-2,6-diisocyanatocyclohexane, 4-isocyanatomethyl-1,8-octane diisocyanate and mixtures thereof.

The preparation of such lacquer polyisocyanates, starting from monomeric diisocyanates, is known to the person skilled in the art and is described on the following pages, with relevant literature references being specified. It is not important whether the diisocyanates used have been prepared by phosgene or phosgene-free processes.

The lacquer polyisocyanates of the above-mentioned type preferably have a content of NCO groups of from 5 to 25 wt. %, a mean NCO functionality of from 2.0 to 5.0, preferably from 2.8 to 4.0, and a residual content of monomeric diisocyanates, which were used for their preparation, of less than 1 wt. %, preferably less than 0.5 wt. %.

Preferred lacquer polyisocyanates of the above-mentioned type are those having aliphatically and/or cycloaliphatically bonded, free isocyanate groups.

Urethane-group-containing lacquer polyisocyanates are, for example, the reaction products of 1-methyl-2,4- and optionally 1-methyl-2,6-diisocyanatocyclohexane with deficient amounts of trimethylolpropane or mixtures thereof with simple diols, for example the isomeric propane- or butane-diols. The preparation of such urethane-group-containing lacquer polyisocyanates in almost monomer-free form is described, for example, in DE-A 1 090 196.

Particularly preferred lacquer polyisocyanates are those of the above-mentioned type having biuret, uretdione, isocyanurate and/or iminooxadiazinedione structures.

Biuret-group-containing lacquer polyisocyanates and their preparation are described, for example, in EP-A 0 003 505, DE-A 110 139 4, U.S. Pat. No. 3,358,010 or U.S. Pat. No. 3,903,127.

Uretdione- and isocyanurate-group-containing lacquer polyisocyanates and their preparation are described, for example, in EP-A 0 377 177.

The isocyanurate-group-containing lacquer polyisocyanates include the trimers or mixed trimers of the diisocyanates mentioned above by way of example, for example the aliphatic, aliphatic/cycloaliphatic and/or cycloaliphatic trimers or mixed trimers based on 1,6-diisocyanatohexane and/or isophorone diisocyanate, which are obtainable, for example, according to U.S. Pat. No. 4,324,879, U.S. Pat. No. 4,288, 586, DE-A 310 026 2, DE-A 310 026 3, DE-A 303 386 0 or DE-A 314 467 2.

Iminooxadiazinedione-group-containing lacquer polyisocyanates and their preparation are to be found, for example, in EP-A 798 299, EP-A 896 009, EP-A 962 454 and EP-A 962 455.

The polyether polyols of components C) and D) are obtainable by technologies known per se in polyurethane chemistry, for example the base-catalysed alkoxylation of suitable starter molecules by means of ethylene oxide and/or propylene oxide. The methods conventional therefor are known to the person skilled in the art and are described, for example, in EP-A 761 708 or WO 97/40086.

Suitable starter molecules for the preparation of the polyether component C) are amino-group-containing molecules, for example 2-aminoethanol, 2-(methylamino)-ethanol, diethanolamine, triethanolamine, 3-amino-1-propanol, diisopropanolamine, 2-amino-2-hydroxymethyl-1,3-propanediol, ethylenediamine, 1,2-diaminopropane, 1,3-diaminopropane, 1,4-diaminobutane, 1,6-diaminohexane, 1,12-diaminododecane or mixtures thereof. Suitable starter molecules for the preparation of the polyether component D) are typically polyhydric alcohols, for example ethylene glycol, 1,2- and 1,3-propanediol, 1,2-, 1,3-, 1,4- and 2,3-butanediol, 1,5-pentanediol, 1,6-hexanediol, 1,8-octanediol, 2-methyl-1,3-propanediol, 2,2-dimethyl-1,3-propanediol, 2-ethyl-2-butyl-1,3-propanediol, 2,2,4-trimethyl-1,3-pentanediol, 2-ethyl-1,3-hexanediol, higher molecular weight α,ω-alkanediols having from 9 to 18 carbon atoms, cyclohexanedimethanol, cyclohexanediols, glycerol, trimethylolpropane, 1,2,4-butanetriol, 1,2,6-hexanetriol, bis(trimethylolpropane), pentaerythritol, sorbitol or mixtures thereof.

Preference is given to the use in C) and D) of starters of the above-mentioned type wherein the functionalities are preferably from 2 to 4.

It is also possible to use starter mixtures of amino-group-containing and amino-group-free starters, in order then to obtain mixtures of the polyether components C) and D).

There are particularly preferably used as component C) polyethers based on triethanolamine and/or diaminoethane, the amino-group-containing polyethers formed thereby having a molecular weight of from 500 to 6000, preferably from 1000 to 4500.

There are particularly preferably used as component D) polyethers based on ethylene glycol and/or 1,2-propanediol, the amino-group-free polyethers formed thereby having a molecular weight of from 500 to 18,000, preferably from 1000 to 12,000 and particularly preferably from 1500 to 8000.

The content of amino-group-containing polyethers, based on the sum of all the polyethers used, is from 5 to 60 wt. %, preferably from 10 to 50 wt. %.

Ethylene oxide and/or propylene oxide are preferably used for the synthesis of the polyethers. The preparation of the polyethers used can be carried out either with base catalysis or by means of DMC catalysis, DMC catalysis being limited to amino-group-free polyethers.

The polyisocyanate mixtures according to the invention are preferably prepared by a two-stage process. To this end, the polyisocyanates A) are placed in a reaction vessel and reacted with the polyol components C) and optionally D). The polyisocyanate component B) is then added and mixed with the resulting reaction product of A) and C) and optionally D).

In a particular embodiment, the polyisocyanate mixtures according to the invention can also be prepared by a one-stage process. In that process, the polyisocyanate components A) and B) are placed in a reaction vessel and then the polyol components C) and optionally D) are added and reacted with the polyisocyanate mixture of A) and B).

In a further preferred embodiment, a two-stage process is again used. To that end, the polyisocyanate component B) is placed in a reaction vessel and reacted with the polyol components C) and optionally D). The polyisocyanate component A) is then added and mixed with the resulting reaction product of B) and C) and optionally D).

The amounts of the compounds used for the reaction of A) with C) and optionally D) are preferably from 55 to 95% A) and from 5 to 45% C) and D), particularly preferably from 60 to 90% A) and from 10 to 40% C) and D) and most particularly preferably from 65 to 85% A) and from 15 to 35% C) and D), based on the solvent-free components.

The amounts of the compounds used in B) and [A)+C)+D)] are preferably from 35 to 75% B) and from 25 to 65% [A)+C)+D)], particularly preferably from 40 to 70% B) and from 30 to 60% [A)+C)+D)] and most particularly preferably from 45 to 65% B) and from 35 to 55% [A)+C)+D)], based on the solvent-free components.

The ratio of the NCO groups in the compounds used in A) and B) to the isocyanate-reactive functions of the polyether polyols used in C) and D) is preferably from 20:1 to 55:1, particularly preferably from 25:1 to 50:1 and most particularly preferably from 30:1 to 45:1.

The preparation of the polyisocyanate mixture according to the invention is usually carried out at temperatures of from 20 to 160° C., preferably from 30 to 140° C. and particularly preferably from 40 to 120° C. for the reaction of the polyether components C) and optionally D) with the polyisocyanate components A) and optionally B). Stabilisers, for example organic acids or acid chlorides, can also be used concomitantly.

In order to accelerate the urethanisation, catalysts known per se, for example organometallic compounds (e.g. lead octoate, tin octoate, dibutyltin dilaurate) or amines (e.g. tertiary amines), can be used. If catalysts are used concomitantly, they are preferably used in amounts of from 0.001 to 5 wt. %, in particular from 0.002 to 2 wt. %, based on the total weight of the reactants in question.

The solids contents of the polyisocyanate mixtures according to the invention, at a runout viscosity of 20 s (DIN 4 mm beaker, 23° C.), are from >50 to 75 wt. %, particularly preferably from >50 to 70 wt. %, it being possible for the solids content to be adjusted by addition of inert solvents of the above-mentioned type. The isocyanate contents of the polyisocyanate mixtures according to the invention are from 7 to 15 wt. %, preferably from 8 to 15 wt. % and particularly preferably from 9 to 14 wt. %.

The polyisocyanate mixtures according to the invention can be used in the production of quick-drying, moisture-curing polyurethane coatings, for example for wood, the coatings exhibiting no tendency to crack formation even at low temperatures of −20° C. Furthermore, the polyisocyanate mixtures according to the invention are also suitable for the production of moisture-curing adhesives and sealing materials. However, their use as raw materials for lacquers and coatings is preferred.

The invention therefore further provides moisture-curing coatings, adhesives and sealing materials, comprising
a) the polyisocyanate mixtures according to the invention,
b) catalysts for accelerating the reaction of the free NCO groups with moisture, and
c) optionally auxiliary substances and additives.

As catalysts b) for accelerating the NCO/water reaction there can be used, for example, tertiary amines, for example triethylamine, pyridine, methylpyridine, benzyl-dimethylamine, N,N-endoethylenepiperazine, N-methylpiperidine, pentamethyl-diethylenetriamine, N,N-dimethylaminocyclohexane, N,N'-dimethylpiperazine, dimorpholinodiethyl ether, or metal salts, for example iron(III) chloride, zinc chloride, zinc 2-ethylcaproate, tin(II) octoate, tin(II) palmitate, dibutyltin(IV) dilaurate and molybdenum glycolate, or arbitrary mixtures of such catalysts. The use of dimorpholinodiethyl ether is most particularly preferred.

Component b) is used in amounts of from 0.001 to 5 wt. %, preferably from 0.01 to 3 wt. %, particularly preferably from 0.05 to 2.5 wt. % and most particularly preferably from 0.1 to 2.0 wt. %, based on the amount of component a) (solid to solid).

Auxiliary substances and additives optionally present in component c) can be, for example, surface-active substances, grinding waxes, internal parting agents, fillers, colourings, pigments, flameproofing agents, hydrolytic stabilisers, microbicides, flow improvers, antioxidants such as 2,6-di-tert-butyl-4-methylphenol, UV absorbers of the 2-hydroxyphenylbenzotriazole type, or light stabilisers of the type HALS compounds substituted or unsubstituted on the nitrogen atom, such as Tinuvin®292 and Tinuvin®770DF (Ciba Spezialitaten GmbH, Lampertheim, Del.), or other commercially available stabilisers and additives, as are described, for example, in "Lackadditive" (Johan Bieleman, Verlag Wiley-VHC Weinheim, New York, Chichester, Brisbane, Singapore, Toronto, 1998, p. 273-370), or arbitrary mixtures of these compounds.

It is also possible here to add inert solvents already mentioned above in order to adjust the viscosity.

It is also possible, but not preferred, to use further NCO-functional prepolymers in addition to the polyisocyanate mixtures a) according to the invention.

In the preparation of the coating compositions according to the invention, the individual components a) to c) are mixed together in any desired sequence.

Coating compositions based on the polyisocyanate mixtures according to the invention can be applied to any desired substrates by methods known per se, for example by spraying, brush coating, flood coating, pouring or with the aid of rollers or knives. Examples of suitable substrates include metal, wood, glass, stone, ceramics materials, concrete, rigid and flexible plastics materials, textiles, leather and paper. Wood is preferred.

Curing can take place at temperatures >5° C., preferably at room temperature or elevated temperature.

All the references described above are incorporated by reference in its entirety for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

Unless indicated to the contrary, all percentages are by weight.

The NCO content of the resins described in the examples and comparison examples is determined by titration in accordance with DIN 53185.

The dynamic viscosities were determined at 23° C. using a rotary viscometer (MCR 51, Anton Paar GmbH, D-73760 Ostfildern).

The Hazen colour value was determined using a colour value measurement device (LICO 400, Dr. Bruno Lange GmbH, D-40549 Düsseldorf).

The residual monomer content was determined by means of GC in accordance with DIN 55956.

The lacquers were cured at room temperature under the influence of atmospheric moisture. The relative humidity was in the range from 30 to 50%. 100% humidity is understood as being the maximum amount of moisture which the air is able to absorb at the corresponding temperature without the formation of water vapour.

Desmodur® IL 1451: TDI-based, isocyanurate-group-containing polyisocyanate, 51 wt. % in butyl acetate with an isocyanate content of 7.4 wt. % (commercial product of Bayer MaterialScience AG, Leverkusen, Del.).

Desmodur® N 3600: Polyisocyanate based on hexamethylene diisocyanate having an isocyanate content of 23.0 wt. % (commercial product of Bayer MaterialScience AG, Leverkusen, Del.).

Desmodur® N 3400: Polyisocyanate based on hexamethylene diisocyanate having an isocyanate content of 21.8 wt. % (commercial product of Bayer MaterialScience AG, Leverkusen, Del.).

Desmodur® XP 2580: Polyisocyanate based on hexamethylene diisocyanate having an isocyanate content of 20.0 wt. % (test product of Bayer MaterialScience AG, Leverkusen, Del.).

Desmodur® XP 2410: Polyisocyanate based on hexamethylene diisocyanate having an isocyanate content of 23.5 wt. % (test product of Bayer MaterialScience AG, Leverkusen, Del.).

Starting Polyisocyanates
Polyisocyanate A1:

A mixture of 18 g of a triethanolamine-started polyether triol having a number-average molecular weight Mn of 1161 g/mol and a propylene oxide content of 86.9 wt. % and 160 g of a propylene-glycol-started polyether having a number-average molecular weight Mn of 4007 g/mol, a propylene oxide content of 85.2 wt. % and an ethylene oxide content of 13.1 wt. % was added dropwise at 80° C. to a mixture of 1003 g of Desmodur® IL 1451, 119 g of butyl acetate and 0.65 g of 2-chloropropionic acid. When the addition was complete, stirring was carried out at 80° C. until the theoretical NCO content of 5.3 wt. % had been reached. The resulting clear prepolymer solution had a solids content of 53.1 wt. %, a viscosity at 23° C. of 682 mPas, an NCO content of 5.2 wt. % and a colour value of 58 APHA.

Polyisocyanate A2:

A mixture of 29 g of a triethanolamine-started polyether triol having a number-average molecular weight Mn of 1161 g/mol and a propylene oxide content of 86.9 wt. % and 164 g of a propylene-glycol-started polyether having a number-average molecular weight Mn of 4007 g/mol, a propylene oxide content of 85.2 wt. % and an ethylene oxide content of 13.1 wt. % was added dropwise at 80° C. to a mixture of 1180 g of Desmodur® IL 1451, 127 g of butyl acetate and 0.75 g of 2-chloropropionic acid. When the addition was complete, stirring was carried out at 80° C. until the theoretical NCO content of 5.3 wt. % had been reached. The resulting clear prepolymer solution had a solids content of 52.8 wt. %, a viscosity at 23° C. of 460 mPas, an NCO content of 5.3 wt. % and a colour value of 61 APHA.

Polyisocyanate A3:

A mixture of 38 g of a triethanolamine-started polyether triol having a number-average molecular weight Mn of 1161 g/mol and a propylene oxide content of 86.9 wt. % and 151 g of a propylene-glycol-started polyether having a number-average molecular weight Mn of 4007 g/mol, a propylene oxide content of 85.2 wt. % and an ethylene oxide content of 13.1 wt. % was added dropwise at 80° C. to a mixture of 1190 g of Desmodur® IL 1451, 122 g of butyl acetate and 0.75 g of 2-chloropropionic acid. When the addition was complete, stirring was carried out at 80° C. until the theoretical NCO content of 5.3 wt. % had been reached. The resulting clear prepolymer solution had a solids content of 52.5 wt. %, a viscosity at 23° C. of 580 mPas, an NCO content of 5.3 wt. % and a colour value of 63 APHA.

Polyisocyanate A4:

A mixture of 46 g of a triethanolamine-started polyether triol having a number-average molecular weight Mn of 1161 g/mol and a propylene oxide content of 86.9 wt. % and 138 g of a propylene-glycol-started polyether having a number-average molecular weight Mn of 4007 g/mol, a propylene oxide content of 85.2 wt. % and an ethylene oxide content of 13.1 wt. % was added dropwise at 80° C. to a mixture of 1198 g of Desmodur® IL 1451, 118 g of butyl acetate and 0.75 g of 2-chloropropionic acid. When the addition was complete, stirring was carried out at 80° C. until the theoretical NCO content of 5.3 wt. % had been reached. The resulting clear prepolymer solution had a solids content of 53.0 wt. %, a viscosity at 23° C. of 719 mPas, an NCO content of 5.2 wt. % and a colour value of 79 APHA.

Polyisocyanate A5:

A mixture of 54 g of a triethanolamine-started polyether triol having a number-average molecular weight Mn of 1161 g/mol and a propylene oxide content of 86.9 wt. % and 126 g of a propylene-glycol-started polyether having a number-average molecular weight Mn of 4007 g/mol, a propylene oxide content of 85.2 wt. % and an ethylene oxide content of 13.1 wt. % was added dropwise at 80° C. to a mixture of 1207 g of Desmodur®IL 1451, 114 g of butyl acetate and 0.75 g of 2-chloropropionic acid. When the addition was complete, stirring was carried out at 80° C. until the theoretical NCO content of 5.3 wt. % had been reached. The resulting clear prepolymer solution had a solids content of 52.9 wt. %, a viscosity at 23° C. of 769 mPas, an NCO content of 5.3 wt. % and a colour value of 75 APHA.

Polyisocyanate B1:

2000 g of Desmodur® N 3400 are added dropwise to 2000 g of Desmodur® N 3600, and stirring was carried out for 30 minutes at 60° C. A clear polyisocyanate mixture having a viscosity of 447 mPas, an isocyanate content of 22.2 wt. % and a colour value of 11 APHA is obtained.

Polyisocyanate B2:

2667 g of Desmodur® N 3400 are added dropwise to 1333 g of Desmodur® N 3600, and stirring was carried out for 30 minutes at 60° C. A clear polyisocyanate mixture having a viscosity of 285 mPas, an isocyanate content of 21.9 wt. % and a colour value of 10 APHA is obtained.

Polyisocyanate B3:

1733 g of Desmodur® N 3400 are added dropwise to 3467 g of Desmodur® N 3600, and stirring was carried out for 30 minutes at 60° C. A clear polyisocyanate mixture having a viscosity of 567 mPas, an isocyanate content of 22.5 wt. % and a colour value of 16 APHA is obtained.

Polyisocyanate 1 (According to the Invention):

Mixture of 62 wt. % polyisocyanate A5 and 38 wt. % Desmodur® N 3400. A clear polyisocyanate mixture having a solids content of 71.5 wt. %, a viscosity of 845 mPas, an NCO content of 11.6 wt. % and a colour value of 53 APHA is obtained.

Polyisocyanate 2 (According to the Invention):

Mixture of 56 wt. % polyisocyanate A5 and 44 wt. % Desmodur® N 3600. A clear polyisocyanate mixture having a solids content of 73.1 wt. %, a viscosity of 1120 mPas, an NCO content of 13.1 wt. % and a colour value of 49 APHA is obtained.

Polyisocyanate 3 (According to the Invention) (Manual Mixing):

Mixture of 60 wt. % polyisocyanate A1 and 40 wt. % Desmodur® XP 2580. A clear polyisocyanate mixture having a solids content of 71.2 wt. %, a viscosity of 500 mPas, an NCO content of 10.8 wt. % and a colour value of 77 APHA is obtained.

Polyisocyanate 4 (According to the Invention) (Manual Mixing):

Mixture of 58 wt. % polyisocyanate A2 and 42 wt. % Desmodur® XP 2410. A clear polyisocyanate mixture having a solids content of 72.3 wt. %, a viscosity of 665 mPas, an NCO content of 12.7 wt. % and a colour value of 58 APHA is obtained.

Polyisocyanate 5 (According to the Invention) (Manual Mixing):

Mixture of 61 wt. % polyisocyanate A3 and 39 wt. % polyisocyanate B2. A clear polyisocyanate mixture having a solids content of 70.6 wt. %, a viscosity of 597 mPas, an NCO content of 11.6 wt. % and a colour value of 53 APHA is obtained.

Polyisocyanate 6 (According to the Invention) (Manual Mixing):

Mixture of 57 wt. % polyisocyanate A5 and 43 wt. % polyisocyanate B3. A clear polyisocyanate mixture having a solids content of 72.5 wt. %, a viscosity of 969 mPas, an NCO content of 12.4 wt. % and a colour value of 71 APHA is obtained.

Polyisocyanate 7 (According to the Invention) (Manual Mixing):

Mixture of 60 wt. % polyisocyanate A4 and 40 wt. % polyisocyanate B1. A clear polyisocyanate mixture having a solids content of 71.9 wt. %, a viscosity of 614 mPas, an NCO content of 12.1 wt. % and a colour value of 136 APHA is obtained.

Polyisocyanate 8 (According to the Invention):

A mixture of 22 g of a triethanolamine-started polyether triol having a number-average molecular weight Mn of 1161 g/mol and a propylene oxide content of 86.9 wt. % and 52 g of a propylene-glycol-started polyether having a number-average molecular weight Mn of 4007 g/mol, a propylene oxide content of 85.2 wt. % and an ethylene oxide content of 13.1 wt. % was added dropwise at 80° C. to a mixture of 499 g of Desmodur® IL 1451, 380 g of Desmodur® N3400, 47 g of butyl acetate and 0.31 g of 2-chloropropionic acid. When the addition was complete, stirring was carried out at 80° C. until the theoretical NCO content of 11.6 wt. % had been reached. The resulting clear polyisocyanate mixture had a solids content of 71.1 wt. %, a viscosity at 23° C. of 690 mPas, an NCO content of 11.1 wt. % and a colour value of 129 APHA.

Polyisocyanate 9 (Comparison)

Reworking of polyisocyanate 1 of EP-A 1 582 543 and adjustment of the mixture to a solids content of 50 wt. % with butyl acetate. A polyisocyanate mixture having a solids content of 50.3 wt. %, a viscosity of 238 mPas, an NCO content of 4.1 wt. % and a colour value of 88 APHA is obtained.

Lacquer Tests

The polyisocyanates were formulated as covering lacquers according to the following basic formulations:

The polyisocyanate in question was adjusted with butyl acetate to a runout viscosity of about 20 s (DIN 4 mm beaker at 23° C., DIN 53211). 0.75 wt. % (based on the delivery form) of dimorpholinodiethyl ether was additionally added to the polyisocyanates according to the invention, which also contain aliphatic polyisocyanates as well as aromatic polyisocyanates.

The following tests were carried out:
1. The stabilities were determined by observing the evolution of the viscosity after 1 day's storage at room temperature and after 15 days' storage in a closed vessel at 50° C. The runout times were determined in accordance with DIN 53211. The stabilities were said to be ok when the ratio of runout time after storage to runout time before storage was <2.
2. The König pendulum hardness of the covering lacquer was determined in accordance with DIN 53157.
3. In order to determine the drying speed, the sand drying[1], the touch drying[2] and the complete drying[3] of 240 μm thick wet lacquer films on glass sheets were determined in minutes.

Sand Drying:

In order to determine the surface drying, grains of sand are carefully applied to the lacquer layer to be tested. After being left for one minute, they are brushed off with a fine camel hair brush, without applying pressure, and the lacquer layer is assessed visually for any remaining grains of sand.

Touch Drying:

The finished lacquers are applied to glass sheets in the required wet film layer thickness (240 μm) and dried at RT. At specified time intervals, which are determined according to the expected end time, the surface is tested with the thumb to see whether it is still tacky. The sample is touch dry when the surface is no longer tacky.

Complete Drying:

The finished lacquers are applied to glass sheets in the required wet film layer thickness (240 μm) and dried at RT. At specified time intervals, which are determined by the expected end time, a pressure of 2-3 kp (check on scales beforehand if necessary) is applied to the film with the thumb. The end point of the determination is the time at which an imprint is no longer visible under obliquely incident light.

4. In order to determine the resistance to solvents, the lacquer films, after 24 hours and after 7 days, were exposed for one minute to a cotton-wool swab soaked with the following solvents: acetone and a 1:1 mixture of butyl acetate and ethyl acetate. The sample is then evaluated visually and after scratching with a fingernail. A rating of 0 means very poor (lacquer film dissolved) and a rating of 5 means very good (no visible change).
5. The scratch resistance was determined as follows: After specified times, the lacquer film, which has been cured at room temperature, is scratched with a fingernail. To that end, the wrist is laid on the test sheet so that the fingernail rests vertically on the lacquer surface. While applying slight pressure, the fingernail is moved jerkily to and fro over the surface (normally to and fro 10 times) and scratch marks are assessed visually. A rating of 0 means very poor (coating is completely destroyed) and a rating of 5 means very good (no visible change).
6. The Gardner gloss was measured after 24 hours and after 7 days.
7. The tendency to yellowing was determined as follows: 180 μm lacquer is applied to white porcelain (200×100 mm). The cured sample is stored behind glass (45° angle and oriented to the south). The colour value (CIELAB, Byk Gardner Color Guide 45/0) is measured prior to storage and after a specified time. Porcelain without lacquer is used as standard/reference. ΔE between the samples and the reference is measured.

Test Results:

| Polyisocyanate-based lacquer | | 1 | 2 | 9 (comp.) |
|---|---|---|---|---|
| Solids content [%] | | 54.4 | 54.4 | 40.0 |
| Viscosity @ 23° C. (DIN 4 beaker) [s] | 0 h | 20 | 20 | 19.5 |
| | 24 h | 21 | 21 | 19.5 |
| | 15 d @ 50° C. | 29 | 26 | 21 |
| König pendulum hardness [s] | 1 h | 42 | 35 | 34 |
| | 2 h | 57 | 49 | 50 |
| | 4 h | 87 | 77 | 83 |
| | 6 h | 112 | 106 | 101 |
| | 8 h | 136 | 140 | 116 |
| | 24 h | 209 | 207 | 150 |
| | 7 d | 210 | 214 | 161 |
| Sand drying [min] | | 14 | 17 | 15 |
| Touch drying [min] | | 18 | 23 | 19 |
| Complete drying [min] | | 26 | 30 | 25 |
| Scratch resistance | 24 h | 3 | 3 | 1-2 |
| | 7 d | 5 | 5 | 3-4 |
| Solvent resistance*) | 24 h Acetone | 4/1 | 4/1 | 0/0 |
| | BA/EA | 5/5 | 4-5/5 | 0/0 |
| | 7 d Acetone | 4-5/4-5 | 4-5/4-5 | 0/0 |
| | BA/EA | 5/5 | 5/5 | 4/1 |
| Gloss | after 24 h 20° | 87.5 | 85.8 | 86.8 |
| | 60° | 96.1 | 95.1 | 95.9 |
| | after 7 d 20° | 86.1 | 83.8 | 81.6 |
| | 60° | 93.5 | 93.8 | 91.7 |

-continued

| Polyisocyanate-based lacquer | | 1 | 2 | 9 (comp.) |
|---|---|---|---|---|
| Yellowing (ΔE) storage outside | 0 h | 1.81 | 1.78 | 2.46 |
| | 14 d | 2.01 | 2.09 | 6.41 |
| | 30 d | 2.28 | 2.43 | 10.40 |
| | 60 d | 3.05 | 3.51 | 17.91 |
| | 90 d | 3.69 | 4.25 | 21.64 |

*)first value determined visually/second value determined visually after scratching with a fingernail.

Discussion of the Test Results:

After adjustment to a processing viscosity of 20 s (DIN 4 mm beaker @ 23° C.), covering lacquers based on polyisocyanates 1 and 2 according to the invention have a solids content of 54.4 wt. %, whereas the solids content of the comparison polyisocyanate 9, at 40.0 wt. %, is much lower at the same viscosity. The drying speed of all the lacquers is comparably quick, but the lacquers according to the invention exhibit quicker development of hardness and a higher final hardness. The scratch resistance of the lacquers according to the invention is better than that of the comparison lacquer. The resistance of the lacquers according to the invention to solvents, especially after only 24 hours, is markedly better than that of the comparison lacquer. The gloss of all the lacquers is at a similarly high level, but the lacquers according to the invention have a markedly lower tendency to yellowing than does the comparison lacquer.

The invention claimed is:

1. A solvent-containing polyisocyanate mixture having a solvent content of less than 50 weight % at a runout viscosity according to DIN 53211 at 23° C. of 20 s, an NCO content of from 7 to 15 weight %, a content of monomeric TDI of less than 0.2 weight %, and a content of monomeric aliphatic and/or cycloaliphatic isocyanates of less than 0.2 weight %, wherein said mixture consists of:
   A) a TDI component containing TDI isocyanurate polyisocyanates;
   B) an aliphatic and/or cycloaliphatic isocyanate component containing aliphatic and/or cycloaliphatic polyisocyanates;
   and
   C) the reaction product of at least one of components A) and/or B) with at least one polyether polyol having a number-average molecular weight of from 500 to 4000 g/mol that contains at least one tertiary nitrogen atom and optionally at least one polyether polyol that does not contain nitrogen atoms.

2. A process for preparing the solvent-containing polyisocyanate mixture of claim 1,
   comprising reacting at least one of components A) and/or B) with at least one polyether polyol having a number-average molecular weight of from 500 to 4000 g/mol that contains at least one tertiary nitrogen atom, and optionally at least one polyether polyol that does not contain nitrogen atoms, in the presence of organic solvents.

3. The process of claim 2, wherein said process is carried out in the presence of stabilizers and catalysts.

4. The process of claim 2, wherein A) is used in an amount of from 55 to 95 weight % and B) is used in an amount of from 5 to 45 weight %, based on the total amount of A) and B).

5. A coating comprising
   a) the solvent-containing polyisocyanate mixture of claim 1;
   b) a catalyst that accelerates the reaction of free NCO groups with moisture; and
   c) one or more auxiliary substances and additives.

6. A coating, adhesive bond, and/or seal comprising the solvent-containing polyisocyanate mixture of claim 1.

7. An adhesive comprising the solvent-containing polyisocyanate mixture of claim 1.

8. A sealing material comprising the solvent-containing polyisocyanate mixture of claim 1.

9. A substrate coated with a coating comprising the solvent-containing polyisocyanate mixture of claim 1.

* * * * *